(12) United States Patent
Chan et al.

(10) Patent No.: US 8,769,665 B2
(45) Date of Patent: Jul. 1, 2014

(54) IP COMMUNICATION DEVICE AS FIREWALL BETWEEN NETWORK AND COMPUTER SYSTEM

(75) Inventors: Allan Chan, Burnaby (CA); Andy Chi Lap Fung, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 372 days.

(21) Appl. No.: 12/771,284

(22) Filed: Apr. 30, 2010

(65) Prior Publication Data
US 2011/0078782 A1  Mar. 31, 2011

Related U.S. Application Data

(60) Provisional application No. 61/246,573, filed on Sep. 29, 2009.

(51) Int. Cl.
*G06F 21/00* (2013.01)
(52) U.S. Cl.
USPC .......................................................... 726/13
(58) Field of Classification Search
USPC ...................................... 726/11, 13
See application file for complete search history.

(56) References Cited

U.S. PATENT DOCUMENTS

| | | | | |
|---|---|---|---|---|
| 4,963,968 A * | 10/1990 | Bugg et al. | ..................... | 348/468 |
| 5,884,025 A * | 3/1999 | Baehr et al. | ..................... | 726/13 |
| 6,141,755 A * | 10/2000 | Dowd et al. | ..................... | 726/11 |
| 6,321,336 B1 * | 11/2001 | Applegate et al. | ............... | 726/11 |
| 6,496,935 B1 * | 12/2002 | Fink et al. | ........................ | 726/13 |
| 2003/0182580 A1 * | 9/2003 | Lee | ............................... | 713/201 |
| 2004/0073811 A1 * | 4/2004 | Sanin | ............................. | 713/201 |
| 2006/0161984 A1 * | 7/2006 | Phillips et al. | .................. | 726/24 |
| 2007/0192844 A1 * | 8/2007 | Chen et al. | ....................... | 726/11 |
| 2008/0235755 A1 * | 9/2008 | Blaisdell et al. | .................. | 726/1 |

OTHER PUBLICATIONS

IP Phone: Wired, Block Diagram (SBD), Texas Instruments, <http://focus.ti.com/docs/solution/folders/print/206.html>, Retreived Feb. 28, 2010, 8 pages.

* cited by examiner

*Primary Examiner* — Lisa Lewis
(74) *Attorney, Agent, or Firm* — Fiala & Weaver P.L.L.C.

(57) ABSTRACT

Methods, systems, and apparatuses are described for implementations of an Internet protocol (IP) communication device (e.g., an IP phone) that contains a firewall. The IP communication device is coupled between a computer system and a network. A data packet is received at a first port of the IP communication device. The data packet is filtered with the firewall included in the IP communication device. The filtered data packet may be transmitted from a second port of the IP communication device (in modified or unmodified form), or may be canceled based on the filtering. In one implementation, the first port is coupled to the network and the second port is coupled to the computer system. In another implementation, the first port is coupled to the computer system and the second port is coupled to the network.

24 Claims, 7 Drawing Sheets

IP COMMUNICATION DEVICE AS FIREWALL BETWEEN NETWORK AND COMPUTER SYSTEM

This application claims the benefit of U.S. Provisional Application No. 61/246,573, filed on Sep. 29, 2009, which is incorporated by reference herein in its entirety.

BACKGROUND OF THE INVENTION

1. Field of the Invention

The present invention relates to Internet protocol (IP) telephones.

2. Background Art

IP (Internet protocol) telephones are being increasingly used by people to make phone calls. An IP phone uses a Voice over IP (VoIP) technology that enables a telephone call to be made over an IP network rather than through the traditional PSTN (public switched telephone network) system. As such, IP phone calls are made over networks such as local area networks (LANs), wide area networks (WANs), or combinations of networks, such as the Internet.

In addition to providing voice capabilities for a user, some IP phones may also function as a bridge between a computer system, such as a PC (personal computer) client, and a network. In such IP phones, data packets transmitted between the computer system and the network are bridged with basic switching technology that is included in the IP phone. As a result, data packets that may be unwanted and/or potentially dangerous are blindly forwarded between the computer system and the network without an inspection of packet rate and/or packet content. These uninspected data packets may be dangerous to other devices coupled to the network. Such data packets are commonly transmitted from computers without the knowledge and/or consent of the computer user due to various factors such as a computer mis-configuration or a computer virus. Left unchecked, these undesired data packets have the potential to adversely impact normal operation of the network and to disrupt other network endpoints.

BRIEF SUMMARY OF THE INVENTION

Methods, systems, and apparatuses are described for Internet protocol (IP) phones that include firewalls substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
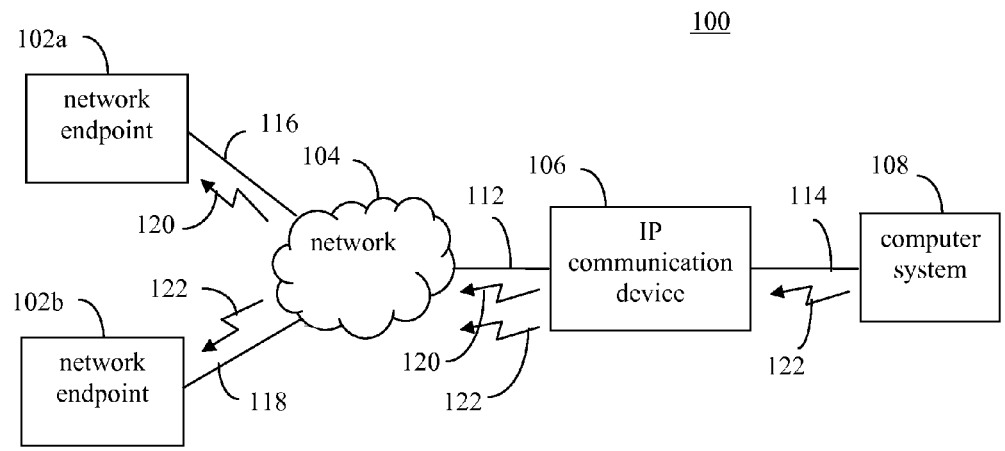
FIG. 1 shows a block diagram of a communication system that includes an IP telephone.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Embodiments

An IP phone is a type of IP communication device that is used to conduct telephone calls over IP networks. An IP phone functions as a telephone for a user, enabling the user to conduct telephone calls over the network according to a voice over IP (VoIP) technology. IP communication devices may alternatively or additionally include video functionality (e.g., "IP video phones"), such that communications including video (e.g., video of the call participants) may be performed over the network. An IP communication device that includes voice and video communication capability may be referred to as a "multimedia" IP phone. Furthermore, an IP communication device may be used to interface computers to networks. Such an IP communication device may act as a switching device for a computer, routing data transmitted from the computer to the network, and routing data received from the network to the computer. In such case, the IP communication device alleviates the need to have a separate switch or router to perform the routing of data.

For instance, FIG. 1 shows a block diagram of an example communication system 100. As shown in FIG. 1, communication system 100 includes a plurality of network endpoints 102a-102b, a network 104, an IP communication device 106, and a computer system 108. IP communication device 106 is coupled to network 104 by a first communication link 112, and is coupled to computer system 108 by a second communication link 114. Network endpoints 102a and 102b are each communicatively coupled with network 104. Network endpoint 102a is coupled to network 104 by a third communication link 116, and network endpoint 102b is coupled to network 104 by a fourth communication link 118. Network endpoints 102a and 102b may be any type of device configured to communicate over network 104, including IP phones, computers, etc. Although two network endpoints 102a and 102b are shown in FIG. 1, any number of network endpoints 102 may be coupled to network 104, including tens, hundreds, and even larger numbers of network endpoints 102.

Network 104 may be any type of computer communication network, including a local area network (LAN), a wide area network (WAN), or a combination of communication networks, such as the Internet. Communication links 112, 114, 116, and 118 may each be any type of network link or interface, wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc. In embodiments, communications may be performed over communication links 112, 114, 116, and 118 according to Ethernet standards in the form of data packets.

IP communication device 106 is configured to function as a telephone (voice) and/or video phone for a user, enabling the user to conduct telephone calls and/or video communications over the network according to a VoIP technology. For instance, in the example of FIG. 1, IP communication device 106 may enable a user to conduct a telephone call with a user of network endpoint 102a. IP communication device 106 may receive voice/sound input from the user of IP communication device 106, and may convert the voice/sound to a stream of voice packets, such as a voice packet stream 120. IP communication device 106 transmits voice packet stream 120 over communication link 112, through network 104, and over communication link 116, to be received by network endpoint 102a. IP communication device 106 may also receive a voice packet stream (not shown in FIG. 1) from network endpoint 102a through communication link 116, network 104, and communication link 112 that includes voice/sound of the user at network endpoint 102a.

Furthermore, IP communication device 106 may include switching capability (e.g., Ethernet switching) to provide for data forwarding between computer system 108 and network 104. For example, as shown in FIG. 1, computer system 108 is coupled to network 104 through IP communication device 106. As such, computer system 108 may communicate with endpoints of network 104 through IP communication device 106. For instance, computer system 108 may communicate with endpoints of network 104 through IP communication device 106 using data packets. As shown in FIG. 1, computer system 108 may transmit a stream of data packets, including a data packet 122 (e.g., an IP packet), over communication link 114 that is received by IP communication device 106. Data packet 122 may be addressed to network endpoint 102b, for example. IP communication device 106 may forward data packet 122 over communication link 112, through network 104, and over communication link 118, to be received by network endpoint 102b. Each data packet of the data packet stream may be similarly received. Furthermore, in a similar manner, network endpoint 102b (or other network endpoint 102) may transmit data packets to computer system 108 through IP communication device 106.

Data packets transmitted between computer system 108 and network 104 are typically bridged with basic switching technology in IP communication device 106. As such, data packets that may be unwanted and/or potentially dangerous are blindly forwarded between computer system 108 and network 104 without an inspection of packet rate and/or packet content. As a result, uninspected data packets, such as data packet 122, may be dangerous to network endpoints 102. For instance, data packet 122 may be transmitted from computer system 108 without the knowledge and/or consent of a user of computer system 108 due to various factors such as a mis-configuration of computer system 108, or a computer virus that infects computer system 108. Left unchecked, these undesired data packets have the potential to adversely impact normal operation of network 104 and to disrupt network endpoints 102.

According to embodiments, a firewall may be included in an IP communication device that interfaces a computer system with a network. The firewall may filter data packets transmitted through the IP communication device to eliminate bad data packets, to modify data packets that can be corrected, or to pass data packets that are not harmful to the network and network endpoints.

Figure 2:
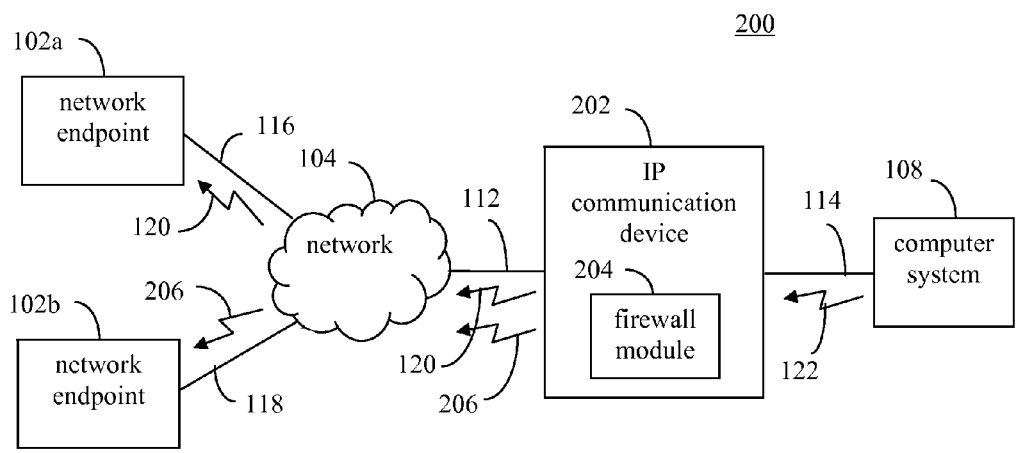
FIG. 2 shows a block diagram of a communication system that includes an IP telephone containing a firewall, according to an example embodiment.

For instance, FIG. 2 shows a block diagram of a communication system 200, according to an example embodiment. System 200 is generally similar to system 100 of FIG. 1, with differences described as follows. As shown in FIG. 2, communication system 100 includes network endpoints 102a-102b, network 104, an IP communication device 202, and computer system 108. As shown in FIG. 2, IP communication device 202 is coupled to network 104 by first communication link 112, and is coupled to computer system 108 by second communication link 114. Network endpoints 102a and 102b are coupled to network 104 as described above with respect to FIG. 1.

Similarly to IP communication device 106 described above, IP communication device 202 is configured to function as a telephone and/or video phone for a user, enabling the user to conduct telephone calls and/or video communications over the network according to a VoIP and/or other technology. For instance, as shown in FIG. 2, IP communication device 202 may enable a user to conduct a telephone call with a user of network endpoint 102a in a similar fashion as described above with respect to FIG. 1. IP communication device 202 may receive voice/sound input from the user, may convert the voice/sound to voice packet stream 120, which is transmitted over communication link 112, through network 104, and over communication link 116, to be received by network endpoint 102a. IP communication device 202 may also receive a voice packet stream from network endpoint 102a through communication link 116, network 104, and communication link 112 that includes voice/sound of the user at network endpoint 102a.

As shown in FIG. 2, IP communication device 202 includes a firewall module 204. Firewall module 204 is configured to filter data packets transmitted from computer system 108 through IP communication device 202 to network 104. Furthermore, in an embodiment, firewall module 204 may be configured to filter data packets transmitted from network 104 (e.g., from a network endpoint 102) through IP communication device 202 to computer system 108. First instance, firewall module 204 may filter (e.g., modify, cancel, etc.) unwanted and/or potentially dangerous data packets that in conventional IP phones may have been blindly forwarded between computer system 108 and network 104 without inspection.

For instance, as shown in FIG. 2, computer system 108 may transmit data packet 122 over communication link 114, to be received by IP communication device 202. Firewall module 204 of IP communication device 202 may filter data packet 122 to generate a filtered data packet 206. Filtered data packet 206 may include modified data. For instance, firewall module 204 may change data, delete data, and/or add data to data packet 122 to generate filtered data packet 206. Filtered data packet 206 may be forwarded by IP communication device 202 over communication link 112, through network 104, and over communication link 118, to be received by network endpoint 102b. Furthermore, in a similar manner, network endpoint 102b (or other network endpoint 102) may transmit data packets to computer system 108 through IP communication device 202 that are filtered by firewall module 204. In some situations, firewall module 204 may be configured to determine that a data packet 122 should not be forwarded from IP communication device 202, and in such case, data packet 122 may be canceled (e.g., filtered data packet 206 may not be generated and transmitted).

Note that firewall module 204 may be implemented in hardware, software, firmware, or any combination thereof For example, firewall module 204 may be implemented as computer code configured to be executed in one or more processors. Alternatively, firewall module 204 may be implemented as hardware logic/electrical circuitry. When implemented in the form of hardware, firewall module 204 may less susceptible to computer viruses than when implemented in software.

Firewall module 202 may be configured to perform various forms of packet filtering to filter and/or meter unwanted and/or potentially dangerous frames from reaching network 104 from computer system 108, or from reaching computer system 108 from network 104. For instance, in one example, firewall module 202 may implement packet filtering technologies developed by Broadcom Corporation of Irvine, Calif., including the Broadcom® Content Aware™ packet classification and packet filtering technology, the Broadcom® BroadShield™ security technology, etc. These packet filtering technologies are provided for purposes of illustration, and are not intended to be limiting. Embodiments of firewall module 200 are applicable to implementing any commercially available or proprietary packet filtering technologies.

Examples of packet filtering techniques that may be implemented in firewall module 202 in embodiments include one or more of standards-based authentication, user quarantine, denial of service (DoS) attack prevention, distributed denial of service attack (DDoS) attack prevention, 'man in the middle' attack prevention, spoofing prevention, support for advanced access control lists (ACLs), stateful firewall processing, rate limiting (ingress and egress) technologies, quality of service (QoS) (e.g., bandwidth reservation, stream control, etc.), CoS (frame classification, etc.), filtering of broadcast ICMP (Internet control message protocol) packets, etc.

Figure 3:
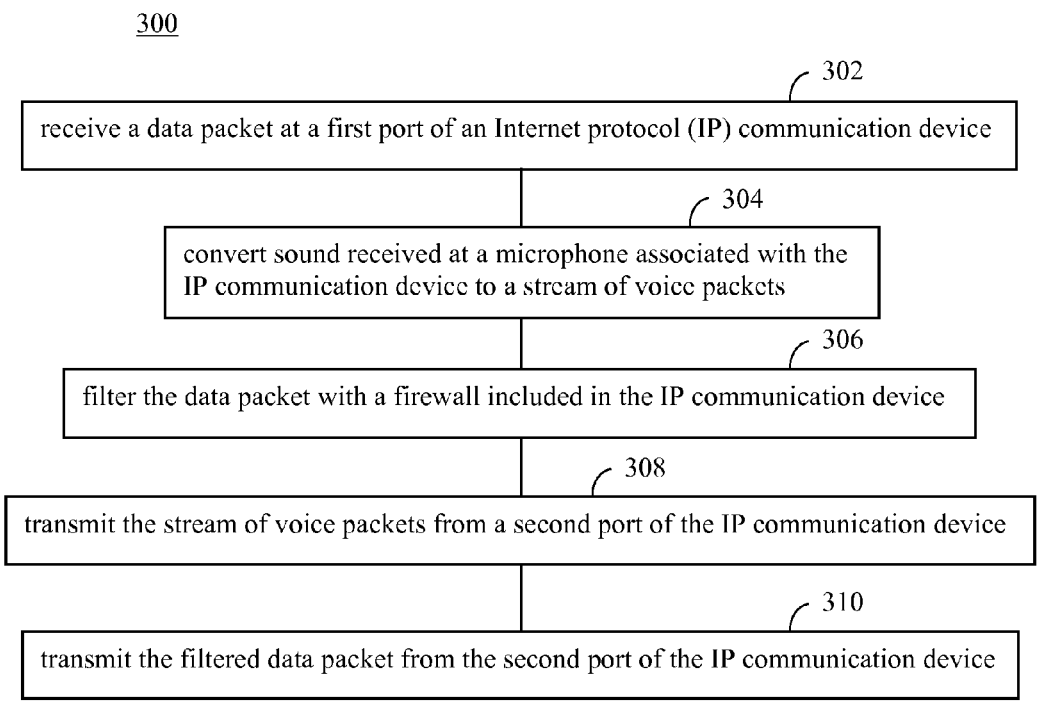
FIG. 3 shows a flowchart for performing a VoIP communication and for filtering data using an IP telephone, according to an example embodiment.
Figure 4:
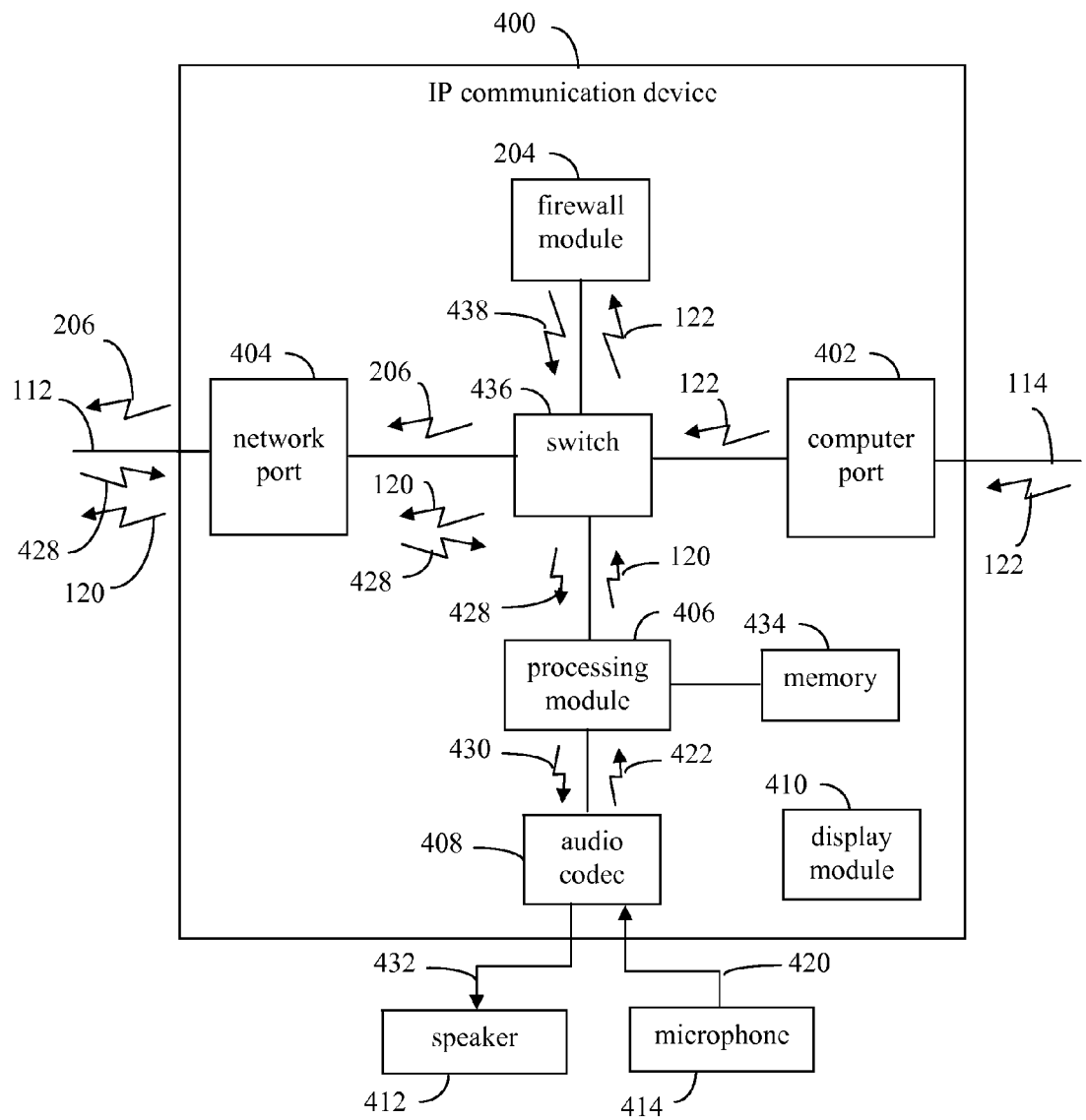
FIGS. 4 and 5 show block diagrams of an IP communication device with an internal firewall, according to example embodiments.

IP communication device 202 and firewall module 204 may be configured in various ways and may operate in various ways. For instance, FIG. 3 shows a flowchart 300 providing a process for filtering data packets and enabling voice communications, according to an example embodiment. IP communication device 202 of FIG. 2 may perform flowchart 300 in an embodiment. Flowchart 300 is described below with reference to FIG. 4, for illustrative purposes. FIG. 4 shows a block diagram of an IP communication device 400, according to an example embodiment. IP communication device 400 is an example of IP communication device 202. In the embodiment of FIG. 4, IP communication device 400 includes firewall module 204, a computer port 402, a network port 404, a processing module 406, an audio codec 408, a UI (user interface) module 410, a speaker 412, a microphone 414, a memory 434, and a switch 436. Other structural and operational embodiments will be apparent to persons skilled in the relevant art(s) based on the discussion regarding flowchart 300. The steps of flowchart 300 do not necessarily need to be performed in the order shown. Flowchart 300 is described as follows.

Flowchart 300 begins with step 302. In step 302, a data packet is received at a first port of an Internet protocol (IP) phone. For instance, as shown in FIG. 4, computer port 402 receives data packet 122 over communication link 114 (from computer system 108 of FIG. 2). In an example embodiment, computer port 402 may be a first Ethernet port of IP communication device 400.

In step 304, sound received at a microphone associated with the IP communication device is converted to a stream of voice packets. For instance, in FIG. 4, microphone 414 is associated with IP communication device 400. Microphone 414 may be an external microphone coupled to IP communication device 400, or may be built into a body of IP communication device 400. One or more users may speak into microphone 414. Received sound (e.g., in the form of user voice) is transmitted from microphone 414 as an electronic microphone signal 420, which is received by audio codec 408. Microphone signal 420 may be converted to digital from by an analog-to-digital converter (included in, or external to audio codec 408), and the digital form of microphone signal 420 may be encoded and/or compressed by audio codec 408. As shown in FIG. 4, audio codec 408 generates an encoded voice signal 422, which is received by processing module 406. Processing module 406 may include one or more processors, such one or more digital signal processors (DSP), one or more central processing units (CPUs), etc., that are capable of being configured to perform voice (e.g., VoIP) processing. For instance, processing module 406 may be configured to process encoded voice signal 422 according to a VoIP technology to generate voice packet stream 120. Memory 434 is shown coupled to processing module 406 in FIG. 4. Memory 434 may be present to perform storage tasks for processing module 406, including buffering incoming encoded voice information, incoming voice packets, etc. Examples of memory 434 include one or more memory devices or other storage device types.

Note that in an embodiment, IP communication device 400 may be a video phone or other type of video communication device that supports phone calls with video. In such an embodiment, flowchart 300 of FIG. 3 may include a step where images received by a camera/sensor associated with the IP communication device are converted to a stream of video packets. For instance, IP communication device 400 of FIG. 4 may include further elements for processing video, such as an image sensor (e.g., a camera), a video codec, and a display. The image sensor may be an external camera coupled to IP communication device 400, or may be built into a body of IP communication device 400. Video of one or more users may be captured by the image sensor. The captured images are transmitted from the image sensor as an electronic image signal, which is received by the video codec. The video codec may encode and/or compress the received electronic image signal, and generate an encoded video signal that is received by processing module 406. Processing module 406 may be configured to process the encoded video signal to generate a video packet stream (which may be optionally buffered/stored by memory 434).

In step 306, the data packet is filtered with a firewall included in the IP communication device. For example, as shown in FIG. 4, data packet 122 is received by switch 436 from computer port 402. Switch 436 may be any suitable switch (router, bridge, etc.) that is implementable in an IP communication device. Switch 436 transmits data packet 122 to firewall module 204. Firewall module 204 receives data packet 122, and performs filtering on data packet 122. Based on the filtering performed on data packet 122, firewall module 204 transmits an instruction 438 to switch 436. Instruction 438 may indicate one or more actions for switch 436 to perform on data packet 122. Switch 436 performs the one or more indicated actions (e.g., changing data, deleting data, adding data) on data packet 122 to generate filtered data packet 206. In some cases, instruction 438 may indicate that data packet 122 is to be canceled. In such case, switch 436 may not generate filtered data packet 206.

In step 308, the stream of voice packets is transmitted from a second port of the IP communication device. For example, as shown in FIG. 4, voice packet stream 120 is received by switch 436. Switch 436 is configured to transmit voice packet stream 120 to network port 404. Network port 404 is configured to transmit voice packet stream 120 over communication link 112 to network endpoint 102a. In an example embodiment, network port 404 may be a second Ethernet port of IP communication device 400.

Note that if IP communication device 400 supports phone calls with video, as described above, flowchart 300 of FIG. 3 may include a step where the stream of video packets is transmitted from the second port of the IP communication device. For example, with reference to FIG. 4, a video packet stream may be received by switch 436 from processing module 406. Switch 436 may be configured to transmit the video packet stream to network port 404. Network port 404 may be configured to transmit the video packet stream over communication link 112 to network endpoint 102a.

As shown in FIG. 4, as part of the voice and/or video communication between the user of IP communication device 400 and a user of network endpoint 102a, a voice packet stream 428 and/or a video packet stream may be received at network port 404 from a network endpoint 102a. Voice packet stream 428 includes sound/voice of the user(s) of network endpoint 102a, and the received video packet stream includes video of the user(s) of network endpoint 102a. Voice packet stream 428 and/or the video packet stream is/are transmitted from network port 404 to switch 436. Switch 436 transmits voice packet stream 428 and/or the video packet stream to processing module 406. Processing module 406 extracts encoded voice information from voice packet stream 428 to generate an encoded voice signal 430, and extracts video information from the video packet stream to generate an encoded video signal. Encoded voice signal 430 is received by audio codec 408 and/or the encoded video signal is received by the video codec. Audio codec 408 decodes and/or decompresses encoded voice signal 430 to generate a speaker signal 432. The video codec decodes and/or decompresses the encoded video signal to generate a display signal. Speaker signal 432 is received by one or more speakers, including a speaker 412 that is associated with IP communication device 400. For example, speaker 412 may be an external speaker coupled to IP communication device 400, or may be built into a body of IP communication device 400. Speaker 412 emits sound (e.g., voice) based on speaker signal 432 so that one or more users of IP communication device 400 can hear the one or more users of network endpoint 102a. The video signal is received by one or more display devices associated with IP communication device 400. The display device(s) display images based on the display signal, which may be viewed by the one or more users of IP communication device 400.

Referring back to flowchart 300, in step 310, the filtered data packet is transmitted from the second port of the IP communication device. For example, as shown in FIG. 4, switch 436 transmits filtered data packet 206 to network port 404 to be transmitted by network port 404 over communication link 112 to network endpoint 102b.

Figure 5:
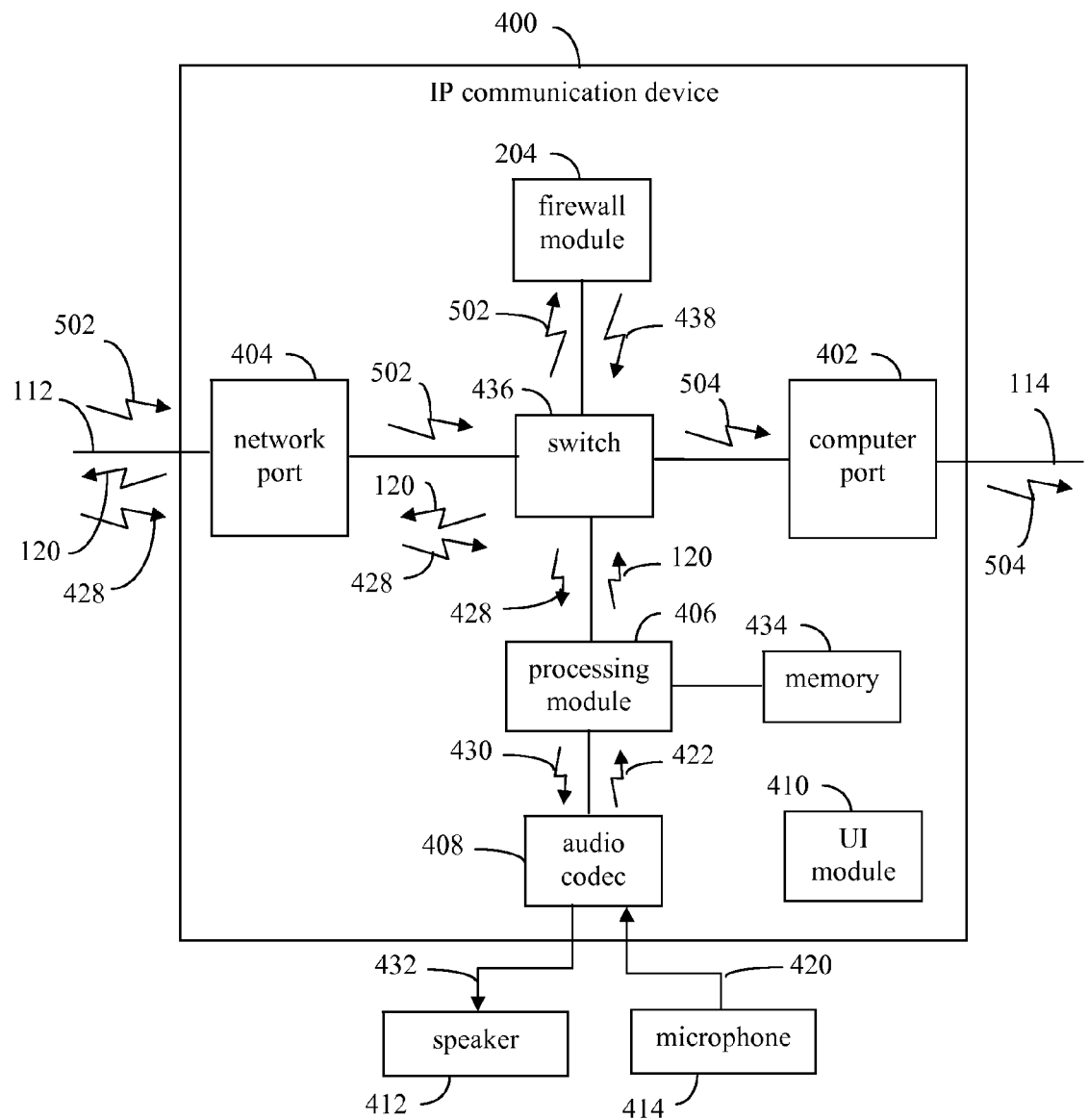

Although flowchart 300 and FIG. 4 illustrate data packets received at computer port 402 that are filtered and forwarded to network port 404 for transmission from IP communication device 400, in embodiments, flowchart 300 may be modified such that data packets are additionally or alternatively received at network port 404 to be filtered and forwarded to computer port 402 for transmission from IP communication device 400. For example, FIG. 5 shows system 400 of FIG. 4, where a data packet 502 is received at network port 404 and is forwarded to computer port 402. As shown in FIG. 5, data packet 502 is received at network port 404 over communication link 112. For instance, data packet 502 may be received from one of network endpoints 102a and 102b shown in FIG. 2 (or other network endpoint). Data packet 502 is transmitted to switch 436 from network port 404. Switch 436 transmits data packet 502 to firewall module 204. Firewall module 204 receives data packet 502, and performs filtering on data packet 502. Based on the filtering performed on data packet 502, firewall module 204 transmits instruction 438 to switch 436. Instruction 438 may indicate one or more actions for switch 436 to perform on data packet 502. Switch 436 performs the one or more indicated actions (e.g., changing data, deleting data, adding data) on data packet 502 to generate filtered data packet 504 (or cancels data packet 502). Switch 436 transmits filtered data packet 504 (when not canceled) to computer port 402 to be transmitted by computer port 402 over communication link 114 to computer system 108. As shown in FIG. 5, a voice and/or video communication between a user of IP communication device 400 and a network endpoint may occur in a similar manner as described above with respect to FIG. 4.

Figure 6:
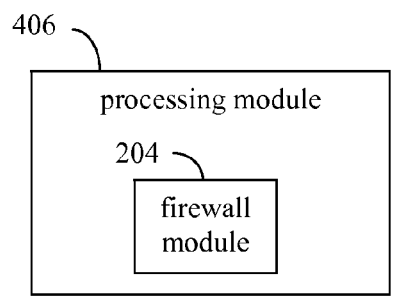
FIG. 6 shows a block diagram of a processing module, according to an example embodiment.

It is noted that in the embodiment of FIGS. 4 and 5, firewall module 204 is indicated as being separate from processing module 406. FIG. 6 shows another embodiment for processing module 406 and firewall module 204, where firewall module 204 may be implemented in processing module 406. In such an embodiment, the processing resources of processing module 406 may be efficiently used such that separate/additional hardware may not be needed in IP communication device 400 to support firewall module 204. Firewall module 204 may be enabled to access memory 434 for storage, as needed. Furthermore, in the embodiment of FIGS. 4 and 5, firewall module 204 is indicated as being separate from switch 436. In another embodiment, firewall module 204 may be implemented in switch 436.

UI module 410 may be included in IP communication device 400 as an interface for a user to interact with IP communication device 400. For example, UI module 410 may be configured to enable a user to configure IP communication device 400, including configuring firewall module 204 (e.g., as described in further detail below). UI module 410 may be configured to enable to a user to initiate a phone call (e.g., by inputting a phone number), to modify phone call settings, to view images/video of one or more other phone call participants (e.g., when IP communication device 400 supports video calling), and/or to perform other functions. UI module 410 may include any number and combination of user interface elements, such as a keyboard, a thumb wheel, a pointing device, a roller ball, a stick pointer, a display, a touch sensitive display, any number of virtual interface elements (e.g., such as a keyboard or other user interface element displayed by a display), a voice recognition system, and/or other user interface elements described elsewhere herein or otherwise known.

Figure 7:
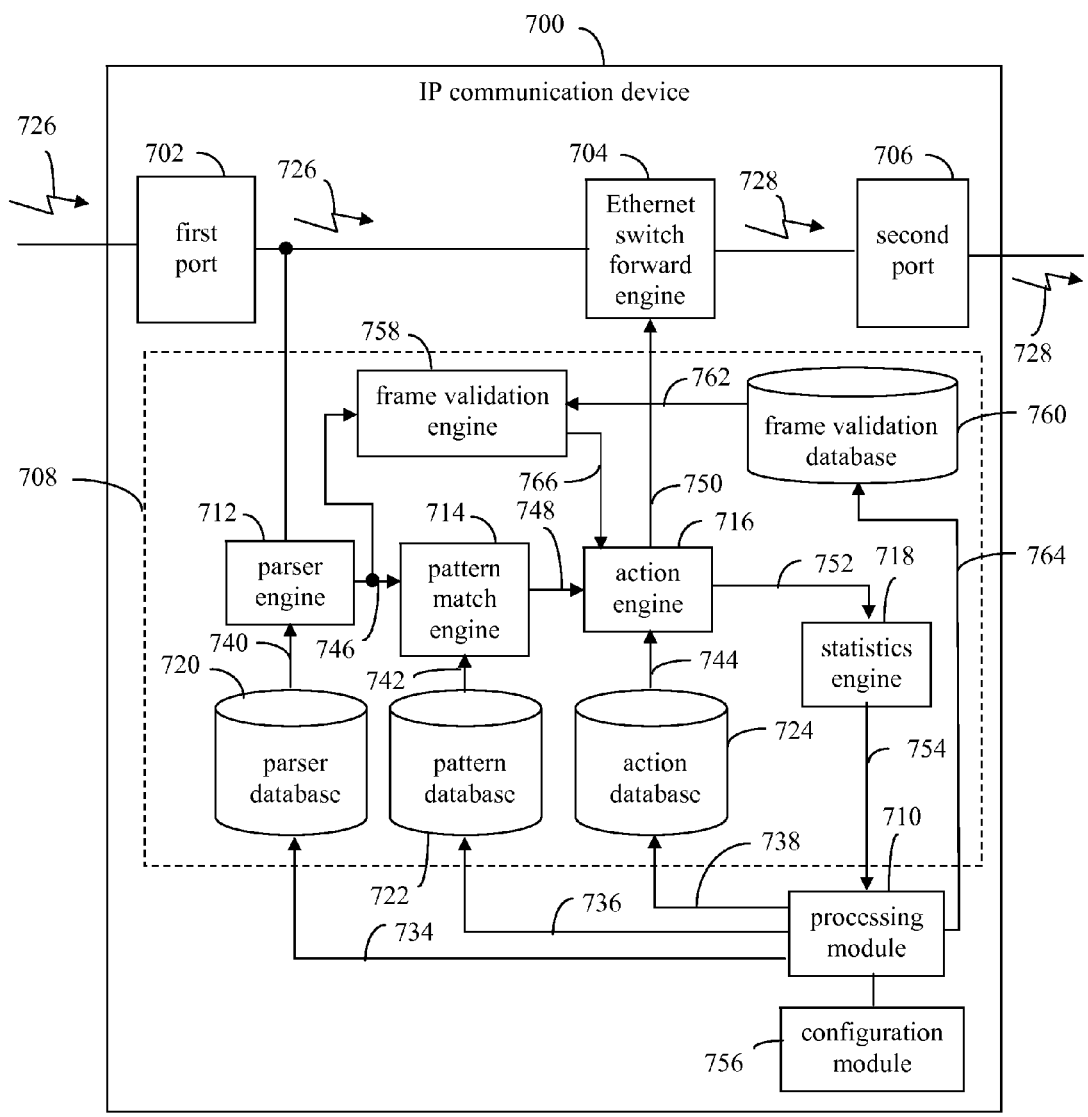
FIG. 7 shows a block diagram of an IP communication device with an internal firewall, according to an example embodiment.
Figure 8:
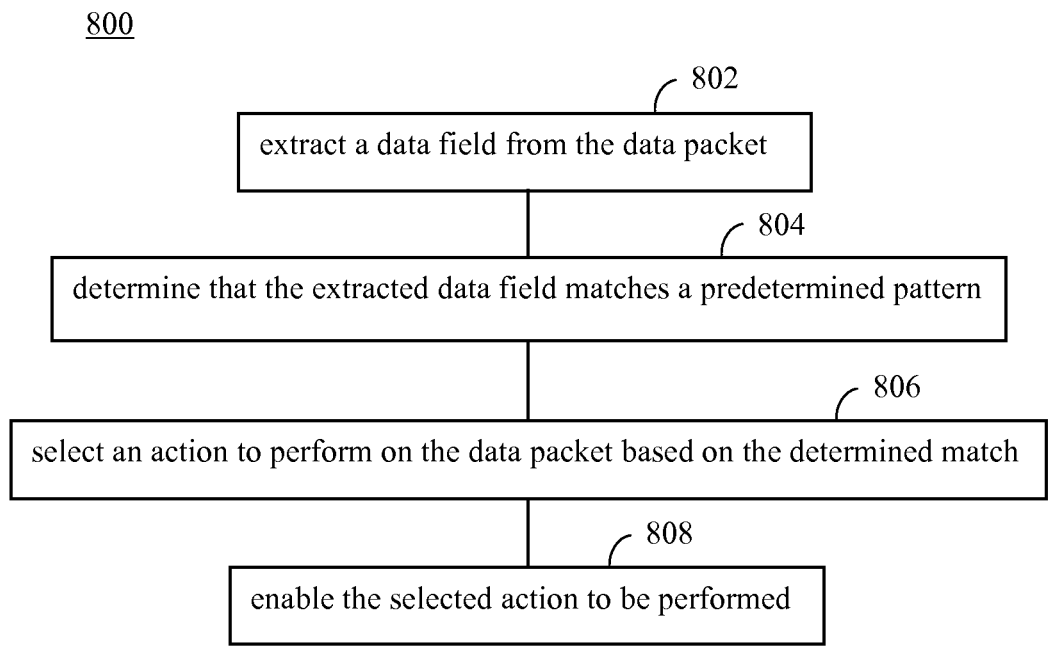
FIG. 8 shows a flowchart for filtering a data packet using a firewall in an IP communication device, according to an example embodiment.

Firewall module 204 may be configured in various ways to perform packet filtering, in embodiments. For instance, FIG. 7 shows a block diagram of an IP communication device 700 that includes a firewall module 708, according to an example embodiment. IP communication device 700 is an example of IP communication device 202 of FIG. 2, and firewall module 708 is an example of firewall module 204. As shown in FIG. 7, IP communication device 700 includes a first port 702, an Ethernet switch forward engine 704, a second port 706, a firewall module 708, a processing module 710, and a configuration module 756. In the embodiment of FIG. 7, firewall module 708 includes a parser engine 712, a pattern match engine 714, an action engine 716, and a statistics engine 718. Parser engine 712 is coupled to a parser database 720, pattern match engine 714 is coupled to a pattern database 722, and action engine 716 is coupled to an action database 724. IP communication device 700 may include further elements that are not shown in FIG. 7 (for ease of illustration), including elements related to VoIP functionality of IP communication device 700 (e.g., audio codec 408, speaker 412, and microphone 414 shown in FIG. 4), Each of these elements of IP communication device 700 is described as follows with respect to FIG. 8, for illustrative purposes. FIG. 8 shows a flowchart 800 for filtering data packets using a firewall in an IP communication device, according to an example embodiment. For example, in an embodiment, flowchart 800 may be performed during step 306 of flowchart 300 (FIG. 3) to filter a received data packet. In an embodiment, IP communication device 700 may operate according to flowchart 800. Other structural and operational embodiments will be apparent to persons skilled in the relevant art(s) based on the discussion regarding flowchart 800. Flowchart 800 is described as follows.

Flowchart 800 begins with step 802. In step 802, a data field is extracted from the data packet. For example, as described above with respect to step 302 of flowchart 300, a data packet is received. For instance, referring to FIG. 7, a data packet 726 may be received by first port 702. First port 702 may be a port that is coupled to a network (e.g., network port 404 of FIG. 4) or a port that is coupled to a computer (e.g., computer port 402 of FIG. 4). Thus, data packet 726 may be received by a network endpoint (e.g., a network endpoint 102 of FIG. 2) or a local computer system (e.g., computer system 108 of FIG. 2), in embodiments. As shown in FIG. 7, parser engine 712 receives data packet 726 from first port 702. In an embodiment, parser engine 712 may be configured to extract one or more data fields from data packet 726. For instance, parser engine 712 may be configured to extract packet data fields in data packet 726 that are indicated in parser database 720 as desired for extraction. Parser engine 712 extracts data entries from the one or more indicated data fields of data packet 726, and generates outputs extracted data fields 746, which includes the extracted data field entries.

Data packet 726, which is an example of data packets 122 and 502 described above, may be any suitable type of data packet, and may include any number of data fields. For instance, in an embodiment, data packet 726 may be an IP packet that includes a header and a payload (user data). Example data fields that may be included in the header (e.g., a IPv4 packet header) include: Version field—4 bits that contain the version and packet type; Header Length field—4 bits that contain the Internet header length; Differentiated Services field—8 bits that contain the Type of Service (also referred to as Quality of Service (QoS)) describing a priority that the packet should have; Total Length field—16 bits that contain the length of the packet in bytes; Identification field—16 bits that contain an identification tag to help reconstruct the packet from several fragments; Flag field—3 bits that contain a zero, a flag that says whether the packet is allowed to be fragmented or not (DF: Don't fragment), and a flag to state whether more fragments of a packet follow (MF: More Fragments); Fragment Offset field—13 bits that contain the fragment offset, a field that identifies which fragment the packet is attached to; Time To Live field—8 bits that contain the time to live (TTL), which is the number of hops (router, computer or device along a network) the packet is allowed to pass before it dies; Protocol field—8 bits that indicate the protocol (TCP—transmission control protocol, UDP—user datagram protocol, ICMP—Internet message control protocol, etc.); Header Checksum field—16 bits that contain the header checksum (e.g., a number that may be used in error detection); Source Address field—32 bits that contain the source IP address; Destination Address field—32 bits that contain the destination address; and Options field. Any one or more of these example data fields may be indicated in parser database 720 for extraction from received data packets, as well as other data fields that may be present in IP packets or other types of data packets that may be received, as would be known to persons skilled in the relevant art(s). For example, data fields of data packet payloads may additionally or alternatively be indicated in parser database 720 for extraction from received data packets. Parser engine 712 may extract the contents/entries of the data fields indicated in parser database 720, and may include the extracted data field contents/entries in extracted data fields 746.

In step 804, the extracted data field is determined to match a predetermined pattern. For example, in an embodiment, pattern match engine 714 may be configured to determine whether the data fields included in extracted data fields 746 match any predetermined patterns. For instance, pattern database 722 may include one or more predetermined data field patterns that may indicate problems or other issues with particular data fields in received data packets. One or more predetermined data field patterns (e.g., bit patterns) may be present in pattern database 722 for each data field of interest indicated in parser database 720. Pattern match engine 714 may receive the predetermined patterns from pattern database 722 as predetermined patterns 742, and may be configured to compare the received predetermined patterns with the corresponding data field entries received in extracted data fields 746 to determine whether the predetermined patterns match any of the data field entries. Any number of matches (e.g., zero or more matches) with predetermined patterns may be possible for a particular data packet. As shown in FIG. 7, pattern match engine 714 generates a matched pattern indication 748 that indicates any predetermined pattern-to-data field entry matches that are determined For example, a data field described above for an IP packet (e.g., version field, header length field, etc.) may include an undesired data pattern, such as an illegal bit code. The illegal bit code may be indicated as a predetermined pattern in pattern database 722 in association with the particular data field. For a received data packet 726, pattern match engine 714 may compare the contents of the data field received in extracted data fields 746 with the predetermined illegal bit code pattern received in predetermined patterns 742, and if they match, indicate the matched pattern in matched pattern indication 748.

In step 806, an action to perform on the data packet is selected based on the determined match. For example, in an embodiment, action engine 716 may be configured to determine an action to be performed based on any matches between data field contents and predetermined patterns indicated in matched pattern indication 748 by action engine 716. For example, in an embodiment, pattern match engine 714 may be configured to search action database 724 for an action to perform on data packet 726 based on any determined matched patterns and/or any rates at which patterns were matched. This allows packet filtering actions to be based on data packet content as well as packet rate.

For example, as shown in FIG. 7, action engine 716 receives matched pattern indication 748. For any matched patterns in matched pattern indication 748, action engine 716 queries action database 724 for corresponding actions. As shown in FIG. 7, action engine 716 may retrieve an action 744 from action database 724 corresponding to a particular matched pattern indicated in matched pattern indication 748. As shown in FIG. 7, action engine 716 outputs an action instruction 750 corresponding to action 744. It is noted that any number of actions 744 may be present in and retrieved from action database 724 corresponding to a particular matched pattern.

In step 808, the selected action is enabled to be performed. For example, as shown in FIG. 7, Ethernet switch forward engine 704 receives action instruction 750 and data packet 726. Ethernet switch forward engine 704 is configured to perform action instruction 750 with respect to data packet 726 to enable data packet 726 to be filtered. Action instruction 750 may include one or more actions to be performed with regard to one or more data fields of data packet 726. As shown in FIG. 7, Ethernet switch forward engine 704 outputs filtered data packet 728, which is a version of data packet 726 filtered according to action instruction 750. Second port 706 receives filtered data packet 728, and transmits filtered data packet 728 from IP communication device 700. Second port 706 may be a port that is coupled to a network (e.g., network port 404 of FIG. 4) or a port that is coupled to a computer (e.g., computer port 402 of FIG. 4). Thus, data packet 728 may be received by a network endpoint (e.g., a network endpoint 102 of FIG. 2) or a local computer system (e.g., computer system 108 of FIG. 2), in embodiments.

For instance, in one example, action instruction 750 may include a data packet modification action. This may happen when data packet 726 includes a correctible defect, for example. In such case, Ethernet switch forward engine 704 may be configured to modify data packet 726 according to the data packet modification action. This may include deleting an entry, changing the entry, and/or adding data to the entry of the data field corresponding to the data packet modification action, to generate filtered data packet 728. After such modification, filtered data packet 728 may be transmitted from Ethernet switch forward engine 704 to second port 706, to be transmitted from IP communication device 700. Filtered data packet 728 may include any number of data fields modified in this manner.

In another example, action instruction 750 may include a data packet cancelation action. This may happen when data packet 726 includes a defect that may be harmful to other network endpoints, and that cannot be corrected by firewall 708, for example. In such case, Ethernet switch forward engine 704 may be configured to cancel data packet 726. In such case, filtered data packet 728 may not be generated, and is not transmitted from second port 706 of IP communication device 700 (e.g., step 310 of flowchart 300 is not performed).

In still another example, action instruction 750 may include a data packet pass action. This may happen when data packet 726 includes one or more defects that do not need to be corrected (e.g., is/are benign), or when data packet 726 is determined to not include any defects, for example. In such case, Ethernet switch forward engine 704 may be configured to forward data packet 726 to second port 706 in an unmodified form, to be transmitted from IP communication device 700.

In an embodiment, in cases where filtered data packet 726 is generated, action instruction 750 may be configured to instruct Ethernet switch forward engine 704 to transmit filtered data packet 726 at a desired transmit rate. Some packet transmit rates and/or traffic patterns can be evidence of vulnerabilities in a networking hardware and/or software implementation of network 104 or computer system 108. As such, when an undesired packet transmit rate and/or traffic pattern is detected by firewall 708 (e.g., by parser engine 712), action instruction 750 may be configured to instruct Ethernet switch forward engine 704 to change/limit (e.g., reduce) a transmit rate of data packets, including filtered data packet 726.

As shown in FIG. 7, firewall module 708 may optionally further include a frame validation engine 758 and a frame validation database 760. Frame validation engine 758 may be present to enable filtering to be performed on data packet 726 based on patterns that are not predetermined As shown in FIG. 7, frame validation engine 758 receives extracted data fields 746 from parser engine 712, and receives framing issue information 762 from frame validation database 760. Frame validation engine 758 is configured to analyze the data field entries received in extracted data fields 746 for framing issues indicated by framing issue information 762 to determine whether any framing issues are present in received data packets. For example, in an embodiment, frame validation engine 758 may be configured to check for framing issues that may not be caught by a static predetermined pattern check (e.g., according to pattern match engine 714, as described above). For example, according to framing issue information 762, frame validation engine 758 is configured to determine one or more of whether a protocol length does not match an actual length, when a packet has a checksum that does not match an expected checksum, whether a packet passes authentication protocols, predetermined patterns that require an impractically large pattern database (e.g., whether the destination IP address matches the source IP address, fields that must be bound within a certain range, etc.).

As shown in FIG. 7, frame validation engine 758 generates a framing issue indication 766 that indicates any framing issues that are determined Action engine 716 receives framing issue indication 766. For any framing issues in framing issue indication 766, action engine 716 queries action database 724 for corresponding actions.

Thus, in an embodiment, flowchart 800 may include a step where it is determined that the data packet has a framing issue or other issue unrelated to a predetermined pattern, and a step where an action is selected to be performed on the data packet based on the determined issue. In step 808, the selected action may be performed.

Note that parser database 720, pattern database 722, action database 724, and frame validation database 760 may have any form, including being arrays, tables, databases, or other data structures. Parser database 720, pattern database 722, action database 724, and frame validation database 760 may be stored in storage associated with IP communication device 700 (e.g., memory 434 shown in FIG. 4 for IP communication device 400).

Statistics engine 718 is optionally present. When present, statistics engine 718 is configured to maintain statistics (e.g., a log file) on the number of times patterns are determined to be matched by pattern match engine 714, and/or on a number of actions that are performed by action engine 716. As shown in FIG. 7, statistics engine 718 receives pattern and action information 752 from action engine 726, which includes pattern match information from matched pattern indication 748 (generated by pattern match engine 714) and action instructions included in action instruction 750 (generated by action engine 716). Statistics engine 718 may calculate and/or accumulate such statistics in any form, such as an array, a database, and/or one or more tables, which may be maintained in storage (e.g., in memory 434 of FIG. 4). Statistics maintained by statistics engine 718 may be read from statistics engine 718, in an embodiment. For example, in embodiment, a user may access UI module 410 (of FIG. 4) to request statistics for viewing on a display, to be output to a file, etc. In such case, processing module 710 may request the statistics from statistics engine 718 to be output to UI module 410. As shown in FIG. 7, processing module 710 receives statistics 754 from statistics engine 718, and may provide statistics 754 to UI module 410 for display, etc.

In an embodiment, a user may configure firewall module 708 by programming one or more of parser database 720, pattern database 722, action database 724, and frame validation database 760. For example, as shown in FIG. 7, configuration module 756 may optionally be present to enable a user to configure one or more of parser database 720, pattern database 722, action database 724, and frame validation database 760. In an embodiment, a user may access configuration module 756 through UI module 410 or other interface, such as computer system 108. According to instructions and/or data input to configuration module 756 through UI module 410, processing module 710 may configure one or more of parser database 720, pattern database 722, action database 724, and frame validation database 760. As shown in FIG. 7, processing module 710 may generate a parser database configuration signal 734 to configure parser database 720, a pattern database configuration signal 736 to configure pattern database 722, an action database configuration signal 738 to configure action database 724, and/or a frame validation database configuration signal 764 to configure frame validation database 760. Each configuration signal may enable data to be added to, modified in, or deleted from a corresponding database, according to a user interacting with configuration module 756. For instance, parser database configuration signal 734 may input, modify, or delete indications in parser database 720 of data frames to be extracted from data packets by parser engine 712. Pattern database configuration signal 736 may input, modify, or delete indications in pattern database 722 of predetermined patterns of interest for matching by pattern match engine 714. Action database configuration signal 738 may input, modify, or delete indications in action database 724 of actions to be performed for matched patterns by action engine 716. Frame validation database configuration signal 764 may input, modify, or delete indications in frame validation database 760 to enable frame validation engine 758 to detect framing issues.

Embodiments include various advantages. For example, embodiments may include one or more of the following advantages: improving network security (for example, particular packet rates and/or traffic patterns can uncover vulnerabilities in the networking hardware and/or software implementation), improving performance of the network (for example, an upstream switch in network 104 is not busy processing unwanted and/or dangerous packets, allowing other, more important traffic to reach its destination), improving security of other client computers/network endpoints (for example, particular packet rates and/or traffic patterns can uncover vulnerabilities in the networking hardware and/or software implementation), improving the performance of other client computers (for example, other client computers are not busy processing unwanted and/or dangerous packets), and improving voice quality of IP communication device 202 by removing unwanted traffic in network 104 generated by a rogue client computer.

Referring to FIG. 2, in embodiments, IP communication device 202 may protect computer system 108 from network 104, may protect IP communication device 202 from computer system 108, and/or may protect IP communication device 202 from network 104. IP communication device 202 may be implemented for various applications, including, but not limited to: performing deeper packet inspection (for example, prevent particular requests from reaching network 104, such as P2P traffic), protecting network 104 and/or client computer from exploiting deficiencies and or vulnerabilities in networking hardware and/or software of network 104 and/or computer system 108 (for example, by limiting packet rates of certain types of frames that may cause a main switch to hit a hardware bug), and/or eliminating a need for a third party firewall on computer system 108 because IP communication device 202 can be configured to provide this functionality, thereby improving performance of computer system 108.

Furthermore, in embodiments, an IP communication device described herein may include a phone port into which a phone endpoint may be connected/plugged to provide phone functionality to the IP communication device (e.g., rather than having phone functionality built into the IP communication device). For instance, referring to FIG. 4, processing module 406, audio codec 408, speaker 412, and microphone 414 may be associated with a phone separate from IP communication device 400. IP communication device 400 may include a phone port that interfaces IP communication device 400 with the separate phone, such that processing module 406 is coupled to switch 436 (e.g., voice packet stream 120, voice packet stream 428, etc., may pass through the phone port). The firewall functionality described herein may be applied to the packets of the various voice and/or video packet streams transmitted between the phone and IP communication device 400 to protect the phone endpoint from packets transmitted from computer system 108 or network endpoints 102a and/or 102b. In other words, the packet filtering of firewall modules 204, 708, etc., may be applied to packets received from computer system 108 or network endpoints 102a and/or 102b to protect the phone endpoint from such packets.

Example Device Implementations

Firewall module 204, processing module 406, audio codec 408, a video codec, Ethernet switch forward engine 704, firewall module 708, processing module 710, parser engine 712, pattern match engine 714, action engine 716, statistics engine 718, frame validation engine 758, and configuration module 756 may be implemented in hardware, software, firmware, or any combination thereof. For example, firewall module 204, processing module 406, audio codec 408, the video codec, Ethernet switch forward engine 704, firewall module 708, processing module 710, parser engine 712, pattern match engine 714, action engine 716, statistics engine 718, frame validation engine 758, and/or configuration module 756 may be implemented as computer program code configured to be executed in one or more processors. Alternatively, firewall module 204, processing module 406, audio codec 408, the video codec, Ethernet switch forward engine 704, firewall module 708, processing module 710, parser engine 712, pattern match engine 714, action engine 716, statistics engine 718, frame validation engine 758, and/or configuration module 756 may be implemented as hardware logic/electrical circuitry.

Figure 9:
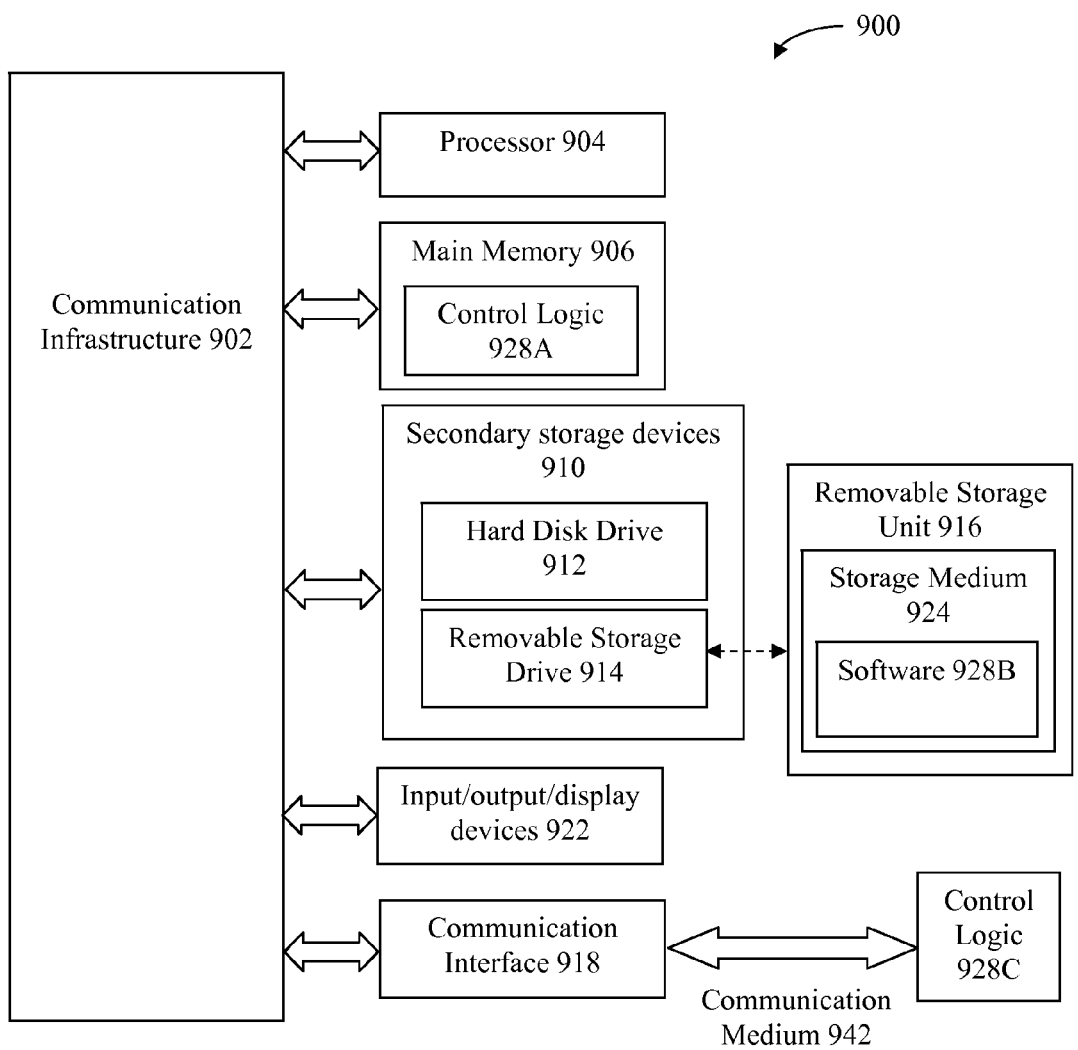
FIG. 9 shows a block diagram of an example IP communication device in which embodiments of the present invention may be implemented.

The embodiments described herein, including systems, methods/processes, and/or apparatuses, may be implemented in IP communication devices. An example IP communication device 900 is shown in FIG. 9, which is an example of IP communication devices 106, 202, 400, and 700 described above. IP communication device 900 is described as follows. Not all features of IP communication device 900 are necessarily shown in FIG. 9 for purposes of brevity.

IP communication device 900 may include one or more processors (also called central processing units, or CPUs), such as a processor 904. Processor 904 is connected to a communication infrastructure 902, such as a communication bus. In some embodiments, processor 904 can simultaneously operate multiple computing threads.

IP communication device 900 also may include a primary or main memory 906, such as random access memory (RAM). Main memory 906 has stored therein control logic 928A (computer software), and data.

IP communication device 900 may also include one or more secondary storage devices 910. Secondary storage devices 910 include, for example, a hard disk drive 912 and/or a removable storage device or drive 914, as well as other types of storage devices, such as memory cards and memory sticks. For instance, IP communication device 900 may include an industry standard interface, such a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 916. Removable storage unit 916 includes a computer useable or readable storage medium 924 having stored therein computer software 928B (control logic) and/or data. Removable storage unit 916 represents a floppy disk, magnetic tape, compact disk, DVD, optical storage disk, or any other computer data storage device. Removable storage drive 914 reads from and/or writes to removable storage unit 916 in a well known manner.

IP communication device 900 may also include input/output/display devices 922, such as monitors, keyboards, pointing devices, etc.

IP communication device 900 further includes a two or more communication or network interfaces 918. Communication interfaces 918 enable IP communication device 900 to communicate with remote devices. For example, communication interface 918 allows IP communication device 900 to communicate over communication networks or mediums 942 (representing a form of a computer useable or readable medium), such as LANs, WANs, the Internet, etc. Network interface 918 may interface with remote sites or networks via wired or wireless connections.

Any apparatus or manufacture comprising a computer useable or readable medium having control logic (software) stored therein is referred to herein as a computer program product or program storage device. This includes, but is not limited to, IP communication device 900, main memory 906, secondary storage devices 910, and removable storage unit 916. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of non-transitory computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for firewall module 204, processing module 406, audio codec 408, a video codec, Ethernet switch forward engine 704, firewall module 708, processing module 710, parser engine 712, pattern match engine 714, action engine 716, statistics engine 718, frame validation engine 758, configuration module 756, flowchart 300, and/or flowchart 800 (including any one or more steps of flowcharts 300 and 800), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents

What is claimed is:

1. A method, comprising:
  receiving a data packet at a first port of an Internet protocol (IP) communication device that is an IP phone;
  filtering the data packet with a firewall included in the IP communication device, said filtering including:
    determining that the data packet has a framing issue; and
    selecting an action to perform on the data packet based on the determined framing issue, the action selected from a plurality of actions indicated in an action database that are associated with a plurality of framing issues; and
  transmitting the filtered data packet from a second port of the IP communication device.

2. The method of claim 1, wherein said receiving comprises:

receiving the data packet at the first port from the computer system; and wherein said transmitting comprises:

transmitting the filtered data packet from the second port to a network endpoint coupled to the network.

3. The method of claim 1, wherein said filtering comprises:

extracting a data field from the data packet;

determining that the extracted data field matches a predetermined pattern; and selecting an action to perform on the data packet based on the determined match.

4. The method of claim 3, wherein said extracting comprises:

determining a set of data fields indicated in a parser database, the set of data fields including an indication of the data field, and extracting the data field from the data packet due to the indication of the data field in the parser database;

wherein said determining comprises:

determining a plurality of predetermined patterns indicated in a pattern database, the plurality of predetermined patterns including the predetermined pattern, and determining that the extracted data field matches the predetermined pattern when determining whether the extracted data field matches any of the plurality of predetermined patterns; and wherein said selecting comprises:

selecting the action from a plurality of actions indicated in the action database that are associated with the plurality of predetermined patterns.

5. The method of claim 4, further comprising:

indicating the determined match in a statistics database.

6. The method of claim 4, further comprising:

enabling a user to configure at least one of the parser database, the pattern database, or the action database.

7. The method of claim 4, wherein said filtering further comprises:

modifying the data packet based on the selected action.

8. The method of claim 3, further comprising maintaining statistics on a number of times an extracted data field matches a predetermined pattern.

9. A method, comprising:

receiving a data packet at a first port of an Internet protocol (IP) communication device;

filtering the data packet with a firewall included in the IP communication device, said filtering including:

extracting a data field from the data packet;

determining that the data packet has an issue unrelated to a predetermined pattern, said determining including:

receiving information from a frame validation database indicating a plurality of framing issues, and determining that the data packet has a framing issue when determining whether the data packet has any of the plurality of framing issues; and selecting an action to perform on the data packet based on the determined issue, said selecting including:

selecting the action from a plurality of actions indicated in an action database that are associated with the plurality of framing issues; and transmitting the filtered data packet from a second port of the IP communication device.

10. The method of claim 9, wherein the first port is connected to a computer system by a link and the second port is coupled to a network, wherein said receiving comprises:

receiving the data packet at the first port from the computer system; and wherein said transmitting comprises:

transmitting the filtered data packet from the second port to a network endpoint coupled to the network.

11. An Internet protocol (IP) communication device, comprising:

an IP phone that includes:

a first port configured to be coupled to a computer system;

a second port configured to be coupled to a network;

an Ethernet switch forward engine coupled between the first port and the second port; and a firewall module coupled to the Ethernet switch forward engine, the firewall module including:

a frame validation engine configured to determine whether the data packet has an issue unrelated to a predetermined pattern, and an action engine coupled to an action database that associates framing issues with corresponding actions, the action engine configured to select one or more actions from the action database to perform on the data packet when the frame validation engine determines that the data packet has the determined issue.

12. The IP communication device of claim 11, wherein the first port receives a data packet from the computer system and a filtered data packet is forwarded from the second port to a network endpoint coupled to the network.

13. The IP communication device of claim 11, wherein the firewall module comprises:

a parser engine configured to extract a data field from a data packet received at the first port; and a pattern match engine configured to determine whether the extracted data field matches a predetermined pattern; and wherein the action engine is further configured to select an action to perform on the data packet if the pattern match engine determines that the extracted data field matches the predetermined pattern.

14. The IP communication device of claim 13, wherein the parser engine is coupled to a parser database that indicates a set of data fields including the data field, the parser engine being configured to extract one or more of the data fields of the set indicated in the parser database from the data packet;

wherein the pattern match engine is coupled to a pattern database that indicates a plurality of predetermined patterns including the predetermined pattern, the pattern match engine being configured to determine whether each of the extracted data fields matches any of the plurality of predetermined patterns; and wherein the action database associates each predetermined pattern of the plurality of predetermined patterns with a corresponding action and the action engine is configured to select one or more actions from the action database to perform on the data packet based on one or more matches between the extracted data fields and the plurality of predetermined patterns determined by the pattern match engine.

15. The IP communication device of claim 14, further comprising:

a statistics engine configured to indicate in a statistics database any determined matches between the extracted data fields and the predetermined patterns.

16. The IP communication device of claim 14, further comprising:

a configuration interface configured to enable a user to configure at least one of the parser database, the pattern database, or the action database.

17. The IP communication device of claim 14, wherein the action engine is configured to generate an instruction to the Ethernet switch forward engine to modify the data packet according to the selected action and to forward the modified data packet to the second port to be transmitted from the IP communication device if the pattern match engine determines that the extracted data field matches the predetermined pattern.

18. The IP communication device of claim 11, wherein the parser engine is coupled to a parser database that indicates a set of data fields, the parser engine being configured to extract one or more of the data fields of the set indicated in the parser database from the data packet;
  wherein the frame validation engine is coupled to a frame validation database that indicates a plurality of framing issues, the frame validation engine being configured to determine whether the data packet has one or more of the plurality of framing issues; and
  wherein the action database associates each framing issue of the plurality of framing issues with a corresponding action and the action engine is configured to select one or more actions from the action database to perform on the data packet based on one or more framing issues determined by the frame validation engine for the data packet.

19. An Internet protocol (IP) communication device, comprising:
  a first port;
  a second port;
  an Ethernet switch forward engine coupled between the first port and the second port; and
  a firewall module coupled to the Ethernet switch forward engine, the firewall module including:
    a parser engine configured to extract a data field from a data packet received at the first port;
    a frame validation engine configured to determine whether the data packet has an issue unrelated to a predetermined pattern; and
    an action engine configured to select an action to perform on the data packet if the frame validation engine determines that the data packet has the determined issue;
  wherein the parser engine is coupled to a parser database that indicates a set of data fields including the data field, the parser engine being configured to extract one or more of the data fields of the set indicated in the parser database from the data packet;
  wherein the frame validation engine is coupled to a frame validation database that indicates a plurality of framing issues, the frame validation engine being configured to determine whether the data packet has one or more of the plurality of framing issues; and
  wherein the action engine is coupled to an action database that associates each framing issue of the plurality of framing issues with a corresponding action, the action engine being configured to select one or more actions from the action database to perform on the data packet based on one or more framing issues determined by the pattern match engine for the data packet.

20. The IP communication device of claim 19, wherein the first port is coupled to a computer system and the second port is coupled to a network.

21. A method in an Internet protocol (IP) communication device, comprising:
  receiving a data packet at a first port of the IP communication device that is an IP phone; and
  filtering the data packet with a firewall included in the IP communication device, said filtering including:
    extracting a data field from the data packet,
    determining that the extracted data field has a framing issue,
    selecting an action to perform on the data packet based on the determined framing issue, the action selected from a plurality of actions indicated in an action database that are associated with a plurality of framing issues, and
    performing the selected action with respect to a second port of the IP communication device.

22. The method of claim 21, wherein said selecting comprises:
  selecting a data packet modification action;
  wherein said performing comprises:
  modifying the data packet according to the data packet modification action, and
  transmitting the modified data packet from the second port of the IP communication device.

23. The method of claim 21, wherein said selecting comprises:
  selecting a data packet cancelation action;
  wherein said performing comprises:
  canceling transmitting of the data packet from the second port of the IP communication device.

24. The method of claim 21, wherein said selecting comprises:
  selecting a data packet pass action;
  wherein said performing comprises:
  transmitting the data packet from the second port of the IP communication device.

* * * * *